March 28, 1950     E. DANNER     2,502,312
TUBULAR GLASS MANUFACTURING APPARATUS Filed July 19, 1945     2 Sheets-Sheet 1

INVENTOR
Edward Danner

March 28, 1950 E. DANNER 2,502,312
TUBULAR GLASS MANUFACTURING APPARATUS
Filed July 19, 1945 2 Sheets-Sheet 2
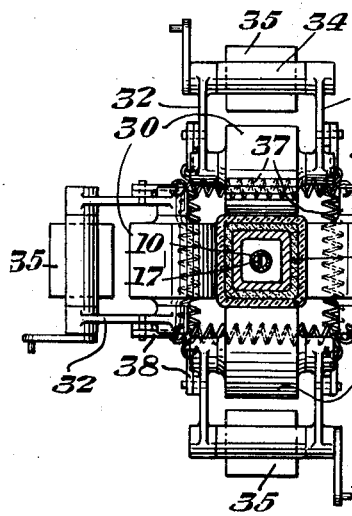
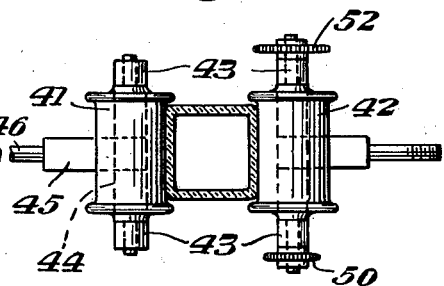
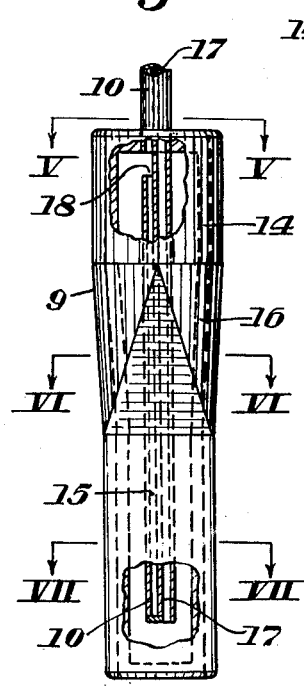
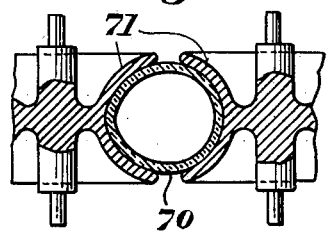
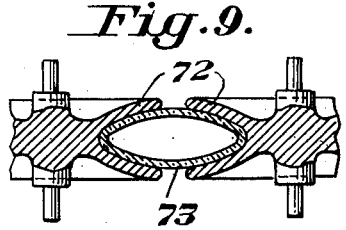
INVENTOR
Edward Danner Patented Mar. 28, 1950

2,502,312

UNITED STATES PATENT OFFICE 2,502,312

TUBULAR GLASS MANUFACTURING APPARATUS

Edward Danner, Newark, Ohio

Application July 19, 1945, Serial No. 605,925

7 Claims. (Cl. 49—17.1)

1

The present invention relates to the manufacture of glassware, and more particularly to the manufacture of tubular glassware. By my invention I provide an apparatus whereby tubular glassware may be formed and then transformed into tubular ware of different cross-sectional shape before the ware has become set.

Heretofore there has been a substantial demand for tubular glassware having a cross-sectional shape other than cylindrical. It has been necessary to manufacture square and other tubing having a cross-sectional shape other than cylindrical in short lengths by molding methods. So far as I am aware, no tubular glassware has heretofore been manufactured by any continuous process other than tubular ware cylindrical in cross section. The manufacture of such ware by molding methods is not economically practicable where substantial quantities are required. Moreover, long lengths of such tubing cannot be made satisfactorily by molding methods. As a consequence, the use of tubing having a cross-sectional shape other than cylindrical has been greatly circumscribed.

The method presently employed for manufacturing the major portion of the glass tubing made throughout the world cannot be used for manufacturing other than cylindrical tubing. I have reference to the manufacture of tubing on the rotating mandrel-type of apparatus. Some tubing, of course, is drawn vertically upwardly from a batch of molten glass in a drawing pot, but neither this method nor the drawing of tubing vertically downwardly lends itself to the manufacture of tubing of cross-sectional shapes other than cylindrical. Great difficulty would be encountered in attempting to draw glass either vertically upwardly or vertically downwardly from a shaping element or orifice shaped to make square tubing, for example, because after the molten glass leaves the shaping element or orifice it tends to flow or draw to a more or less cylindrical cross section. Furthermore, great difficulty would be encountered in obtaining the desired uniform wall thickness from an orifice or shaping element of a configuration other than circular at the point where the ware is initially formed because of the flow conditions, uniform temperatures and viscosity required.

By the present invention I provide an apparatus whereby tubing which is square, hexagonal, octagonal or oval in cross section can be drawn continuously vertically, economically and at high speed, the resulting product having a uniform wall thickness. Thus it will be seen that my invention will result in an enlargement of the use of different shapes and forms of glass tubing. For example, square tubing of many desirable sizes and wall thicknesses can be produced continuously and cut into suitable lengths and may

2 be used for fluorescent lighting or glass building blocks or tile. The tubing, blocks or tile can be made from any suitable type of glass. For example, clear glass or cellular glass may be employed. Also tubes, blocks or tile of various colors and other characteristics may be made from various types of glass.

In carrying out my invention the glass is passed from the melting tank or the forehearth of the melting apparatus through a discharge orifice and delivered to a shaping element over which the molten glass flows downwardly. This shaping element preliminarily forms the molten glass into substantially cylindrical form. The preliminarily formed ware continues downwardly and passes over a transformer. The upper portion of this transformer with which the preliminarily formed ware initially comes in contact is the same cross-sectional shape as the preliminarily formed ware. As the glass passes downwardly over this transformer its cross-sectional shape is modified to the desired final shape. By the time the glass reaches the lower end of the transformer and has been formed to the desired cross-sectional shape it has become at least partially set. It is discharged from the transformer and passed to any suitable handling equipment. It may be cut to length while moving vertically downwardly or, where relatively small ware is being formed, it may be turned and passed horizontally along conveying mechanism and sheared to proper lengths during its horizontal travel. In most instances it is desirable to utilize shaping members which are maintained in pressure contact with the external surface of the tubular ware at the lower or final shaping end of the transformer in order to assure that the glass will be of exactly the desired configuration both internally and externally. This method and apparatus permit the continuous manufacture of square and other types of glass tubes in sizes which could not heretofore be manufactured economically.

In the accompanying drawings I have shown, for purposes of illustration only, a preferred embodiment and several modifications of my invention.

In the drawings,

Fig. 2 is a horizontal section taken along the line II—II of Fig. 1;

Fig. 3 is a horizontal section taken along the line III—III of Fig. 1;

Fig. 4 is an elevational view, partly broken away, illustrating the transformer provided by my invention;

Fig. 5 is a section taken along the line V—V of Fig. 4;

Fig. 6 is a section taken along the line VI—VI of Fig. 4;

Fig. 7 is a section taken along the line VII—VII of Fig. 4;

Fig. 8 is a horizontal section showing the formation of tubing having one part thereof of parabolic shape; and Fig. 9 is a sectional view illustrating the manufacture of tubing of elliptical cross section.

Figure 1:
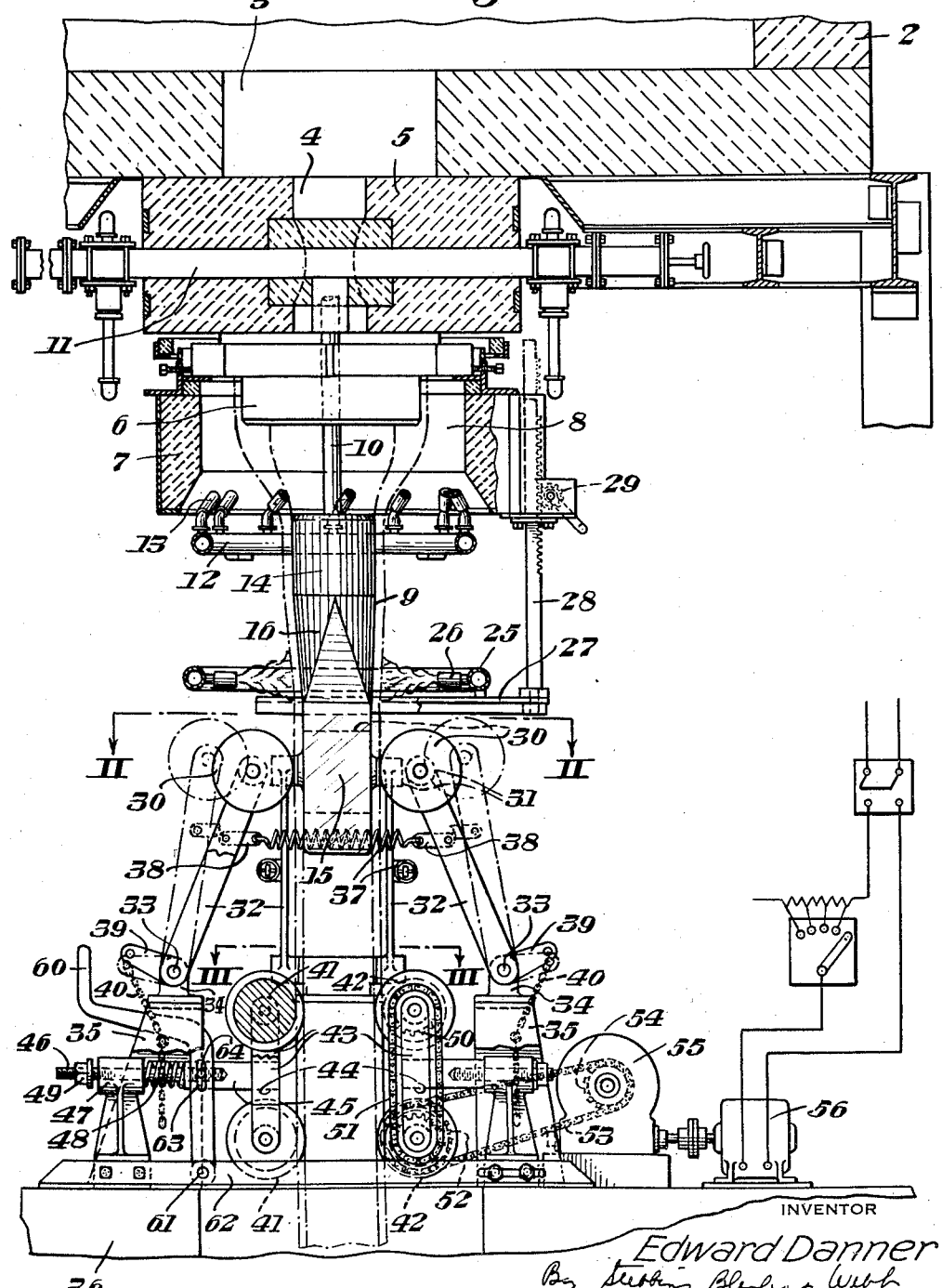
Fig. 1 is an elevational view, partly in section, showing apparatus embodying my invention.

As shown in the drawings, the molten glass passes from the forehearth or melting apparatus 2 through an outlet 3 and then passes downwardly through a hole 4 in a block 5 positioned below the outlet from the forehearth or melting tank, the hole 4 being disposed in alignment with the outlet 3. The glass continues downward through the hole 4 and passes onto the upper end of a shaping element 6 adapted to shape the molten glass into cylindrical form. The shaping element 6 is preferably in the form of a plurality of coaxial shells arranged one within the other, such as is disclosed in my Patents No. 2,390,925 and No. 2,390,926, dated December 11, 1945. A circular shell 7 extends around the shaping element and forms a forming chamber 8 which is open at its lower and upper ends and which extends upwardly toward the block 5 and is vertically adjustable so as to control the flow of gases through the forming chamber by adjustment of the space between the shell 7 and its cooperating parts and the block 5. This apparatus is more fully shown and described in my Patent No. 2,462,806 and reference is hereby made to that patent for a more complete description thereof.

After the glass has been preliminarily formed by the shaping element 6, it passes downwardly through the forming chamber 8 and passes over a transformer 9 which is supported by a pipe 10 which extends upwardly through the preliminarily formed ware and through the shaping element, and is supported at its upper end on a horizontally extending conduit 11 in the manner set forth in detail in said Patent No. 2,462,806.

A burner ring 12 is provided adjacent the lower end of the shell 7 for supplying a combustible gas to a plurality of burners 13 which are spaced around the formed ware. These burners may be used for supplying additional heat, if desired, to the plastic glass as it passes between the shaping element and the transformer. If desired, these burners may be used for projecting a cooling gas against the downwardly moving, preliminarily formed ware.

The transformer 9 has an upper cylindrical section 14, a lower section 15 which is square in cross section, and a central or intermediate section 16 of changing cross section. At its upper end it is cylindrical in cross section, and it progressively changes until at its lower end it is square in cross section to conform with the lower section 15. The transformer is hollow so that a cooling fluid may be passed therethrough. The pipe 10 is divided by a wall 17 which extends from the horizontally extending pipe 11 to the lower end of pipe 10, but only one-half of the pipe at its lower end is closed so that water or some other cooling liquid can pass downwardly through the right-hand side of the pipe 10 and be discharged into the interior of the transformer. The left-hand side of the pipe has an opening 18 near the top of the transformer and, when the transformer has become filled with water, the water will pass through the opening 18 and upwardly through the left-hand side of the pipe which connects with a discharge outlet (not shown).

The transformer is covered with a coating 19 of graphite or mold paste or some other lubricating material in order to prevent the glass from sticking as it passes thereover. This coating of graphite may be formed in sections and then placed on the transformer and the sections secured in place in any suitable manner.

As the glass is drawn over the transformer, additional heat may be supplied to it by means of a circular pipe 25 carrying a plurality of burners 26. The pipe 25 may be mounted on arms 27 which are vertically adjustable by a rack 28 and a hand-operated pinion 29.

While the glass is passing over the lower end of the transformer, the outer surface is contacted by a plurality of truing-rolls 30. In the instance illustrated the glassware being formed is square in cross section and, consequently four truing-rolls 30 will be utilized and will be maintained under some pressure in contact with the downwardly moving glass. Each roll 30 is journalled in bearings 31 carried by arms 32 which, at their lower ends, are mounted on cross shafts 33. These cross shafts 33 are journalled in bearings 34 carried on standards 35 which are in turn supported on the base 36.

Opposing rolls are joined together by a tension spring 37, the ends of the springs being connected to links 38 carried by the arms 32.

Each shaft 33 has keyed to it an arm 39, and a chain 40 is connected to the outer end of each arm 39 so that, when desired, the rolls 30 may be moved out of contact with the transformer or the glass passing downwardly over the transformer. In Fig. 1 the rolls, in the position which they occupy during operations, are shown in solid lines. They are shown in chain lines in this same figure when withdrawn from contact with the glass passing over the transformer.

After the glass has passed over the lower end of the sizer it is received by the drawing or supporting speed rolls 41 and 42. The upper and lower rolls 41 are journalled in the upper and lower ends of the vertically extending members 43, and these members are joined together by a cross member 44 which is in turn connected to a horizontally extending member 45 into the outer end of which is threaded a rod 46 which is supported in a bearing 47. Between the bearing 47 and the member 45 a compression spring 48 is mounted, and this compression spring normally urges the rolls 41 into contact with the tube being drawn. A nut 49 adjacent the end of the rod 46 determines the extent to which the rolls 41 may be moved forwardly toward the ware by the compression spring.

The fixed drawing or supporting rolls 42 are mounted in substantially the same way as the rolls 41. These rolls, however, are provided with sprocket wheels 50 over which a chain 51 passes. A sprocket wheel 52 is mounted on the shaft of the lower roll 42, and a chain 53 passes around this sprocket wheel and also around a sprocket wheel 54 carried by a speed reducer 55 which is driven by a motor 56. In this way both of the rolls 42 are driven and the speed thereof may be regulated in order to control the speed of draw.

The functioning of the rolls 41 and 42 will depend upon the speed at which the rolls 42 are driven. If the rolls 42 are driven at the same speed as the downward travel of the tube or at a slightly slower speed, the rolls 41 and 42 will partially support the formed ware as it is discharged from the transformer. If driven at a slightly faster rate than the speed of draw, they may be used to exert a pulling action on the glass as it passes over the transformer.

A handle 60 is pivoted on a pin 61 carried by the angle 62 forming a part of the base structure. This handle intermediate its ends has a slot 63 into which a pin 64 extends. The pin 64 is carried by the member 45, and as the handle 60 is rocked on its pivot pin it forces the rolls 41 rearwardly against the compression of the spring 48.

After the ware passes beyond the drawing rolls 41 and 42 it may be cut by cutting apparatus (not shown) into any desired lengths.

In Fig. 8 I have illustrated the manufacture of tubing 70 which is egg shaped in cross section. Where tubing of this cross section is being manufactured, of course, rolls such as those illustrated in Figs. 1 and 2 cannot be used since the rolls must conform to the configuration desired in the finished product. As is illustrated in Fig. 8, the rolls 71 may have suitably shaped concave contacting surfaces. These rolls may be mounted in exactly the same way as the rolls of the embodiment illustrated in Figs. 1 and 2, although, of course, only two truing-rolls instead of four will be used in manufacturing glassware of this configuration.

In Fig. 9 I have illustrated the type of rolls 72 which would be required to form tubing 73 of elliptical cross section. Here again the rolls 72 are provided with suitably shaped concave ware-engaging surfaces and two truing-rolls instead of four would be utilized.

It will be apparent from what has been stated above that the number of rolls and the configuration of the ware-engaging surfaces will depend upon the cross-sectional shape of the tubing, the wall thickness of the tubing, and the characteristics of the glass being made into tubing.

In the preferred embodiment of my invention a round shaping element is used. It is generally preferable to use a round shaping element or orifice, but my invention, of course, is not limited to the preliminary forming of the ware into cylindrical shape. The shaping element or orifice can be of such character as to preliminarily form the ware into various other configurations, the finished ware being modified by the transformer to any desired shape.

In the preferred embodiment of my invention the circumference of the ware after passing over the transformer is substantially the same as the circumference of the preliminarily formed ware, but it will be obvious to those skilled in the art that the preliminarily formed ware can have a circumference smaller than the circumference of the finished ware, the circumference being enlarged somewhat by the passage of the preliminarily formed ware over the transformer.

In carrying out my invention the ware-forming conditions will have to be modified in accordance with the characteristics of the glass, the size of the tubing, the wall thickness of the tubing and the prevailing temperature conditions. Cooling or heating means may be provided in order to cope with the various conditions encountered during the formation of the ware. As stated above, where my invention is employed, the tubing may be manufactured at relatively high speed, but, of course, the speed of draw will depend upon various conditions such as the size of the tubing, the wall thickness and the characteristics of the glass being used.

While I have shown and described a preferred embodiment of my invention and two modifications thereof, it will be understood by those skilled in the art that it may be otherwise embodied within the scope of any of the appended claims.

I claim:

1. Apparatus for the manufacture of tubular glassware comprising a container for molten glass, said container having a discharge orifice for discharging a stream of glass by gravity from the container, a shaping element, means for supporting the shaping element in the path of the stream of glass, whereby the molten glass flows downwardly over said shaping element and is preliminarily shaped into tubular form, a stationary transformer, and means extending downwardly through the preliminarily shaped tube for supporting the transformer below and in spaced relation with respect to said shaping element and within the preliminarily formed tube, said transformer having a surface configuration to cause the glass as it slides downwardly thereover to change its cross-sectional shape.

2. Apparatus for the manufacture of tubular glassware comprising a container for molten glass, said container having a discharge orifice for discharging a stream of glass by gravity from the container, a shaping element, means for supporting the shaping element in the path of the stream of glass, whereby the molten glass flows downwardly over said shaping element and is preliminarily shaped into tubular form, a stationary transformer, and means extending downwardly through the preliminarily shaped tube for supporting the transformer below and in spaced relation with respect to said shaping element and within the preliminarily formed tube, said transformer being substantially cylindrical at the upper end thereof and having a substantially different outer surface configuration at the lower end thereof and an intermediate portion varying in shape between that of the upper and that of the lower portions.

3. Apparatus for the manufacture of tubular glassware comprising a container for molten glass, said container having a discharge orifice for discharging a stream of glass by gravity from the container, a shaping element, means for supporting the shaping element in the path of the stream of glass, whereby the molten glass flows downwardly over said shaping element and is preliminarily shaped into tubular form, a stationary transformer, and means extending downwardly through the preliminarily shaped tube for supporting the transformer below and in spaced relation with respect to said shaping element and within the preliminarily formed tube, said transformer having upper, lower and middle portions, the upper portion being cylindrical and the lower portion being of different configuration, the middle portion tapering from the one configuration to the other.

4. Apparatus for the manufacture of tubular glassware comprising a container for molten glass, said container having a discharge orifice for discharging a stream of glass by gravity from the container, a shaping element, means for supporting the shaping element in the path of the stream of glass, whereby the molten glass flows downwardly over said shaping element and is preliminarily shaped into tubular form, a stationary transformer, means extending downwardly through the preliminarily shaped tube for supporting the transformer below and in spaced relation with respect to said shaping element and within the preliminarily formed tube, said transformer having a surface configuration to cause the glass as it slides downwardly thereover to change its cross-sectional shape, and supporting means positioned below the transformer for supporting the tubing as it is discharged from the transformer.

5. Apparatus for the manufacture of tubular glassware comprising a container for molten glass, said container having a discharge orifice for discharging a stream of glass by gravity from the container, a shaping element, means for supporting the shaping element in the path of the stream of glass, whereby the molten glass flows downwardly over said shaping element and is preliminarily shaped into tubular form, a stationary transformer, means extending downwardly through the preliminarily shaped tube for supporting the transformer below and in spaced relation with respect to said shaping element and within the preliminarily formed tube, said transformer having a surface configuration to cause the glass as it slides downwardly thereover to change its cross-sectional shape, and shaping means yieldingly engaging the outer periphery of the tube as it passes over the transformer.

6. Apparatus for the manufacture of tubular glassware comprising a container for molten glass, said container having a discharge orifice for discharging a stream of glass by gravity from the container, a shaping element, means for supporting the shaping element in the path of the stream of glass, whereby the molten glass flows downwardly over said shaping element and is preliminarily shaped into tubular form, a stationary transformer, means extending downwardly through the preliminarily shaped tube for supporting the transformer below and in spaced relation with respect to said shaping element and within the preliminarily formed tube, said transformer having a surface configuration to cause the glass as it slides downwardly thereover to change its cross-sectional shape, a plurality of rolls engaging the outer surface of the tube as it passes downwardly over the transformer, and supporting means below the transformer for receiving the tube after it is discharged therefrom.

7. Apparatus for the manufacture of tubular glassware comprising a container for molten glass, said container having a discharge orifice for discharging a stream of glass by gravity from the container, a shaping element, means for supporting the shaping element in the path of the stream of glass, whereby the molten glass flows downwardly over said shaping element and is preliminarily shaped into tubular form, a stationary transformer, means extending downwardly through the preliminarily shaped tube for supporting the transformer below and in spaced relation with respect to the shaping element and within the preliminarily formed tube, said transformer having an upper cylindrical portion and a lower portion of different cross-sectional shape, heating means for heating the outer surface of the tube as it slides downwardly over the transformer, and means below the transformer for receiving the tube after it is discharged therefrom.

EDWARD DANNER.

REFERENCES CITED

The following references are of record in the file of this patent:

UNITED STATES PATENTS

| Number | Name | Date |
| --- | --- | --- |
| 1,574,482 | Hirsch | Feb. 23, 1926 |
| 1,743,960 | Favre | Jan. 14, 1930 |
| 1,766,638 | Howard | June 24, 1930 |
| 2,131,417 | Danner | Sept. 27, 1938 |
| 2,370,618 | Danner | Mar. 6, 1945 |
| 2,390,925 | Danner | Dec. 11, 1945 |
| 2,390,926 | Danner | Dec. 11, 1945 |
| 2,396,254 | Everett | Mar. 12, 1946 |

FOREIGN PATENTS

| Number | Country | Date |
| --- | --- | --- |
| 2,260 | Great Britain | A. D. 1893 |
| 304,664 | Great Britain | May 22, 1930 |
| 506,384 | Germany | Sept. 3, 1930 |
| 348,857 | Great Britain | May 21, 1931 |
| 428,421 | Great Britain | May 31, 1935 |
| 544,386 | Great Britain | Apr. 10, 1942 |